Aug. 14, 1962     B. RAISTRICK ET AL     3,049,419
GRANULAR FERTILISERS
Filed May 2, 1960
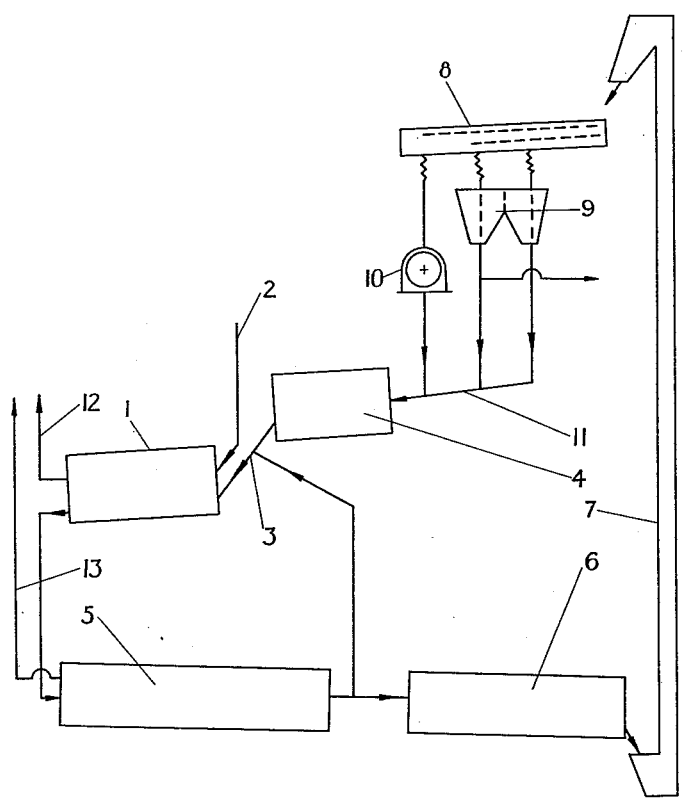
INVENTORS
BERNARD RAISTRICK
JOHN STEWART RAITT
BY Cushman, Darby + Cushman
ATTORNEYS

3,049,419
GRANULAR FERTILISERS
Bernard Raistrick and John Stewart Raitt, Edinburgh, Scotland, assignors to Scottish Agricultural Industries Limited, Edinburgh, Scotland, a corporation of Great Britain
Filed May 2, 1960, Ser. No. 26,305
Claims priority, application Great Britain Aug. 1, 1957
8 Claims. (Cl. 71—64)

The present invention relates to an improved process of manufacturing potassium metaphosphate, in particular, in a granular form suitable for use as a fertiliser. The potassium metaphosphate of the present invention is substantially potassium Kurrol's salt $(KPO_3)_n$.

A fertiliser is defined as a compound or a mixture of compounds which contain nitrogen and/or phosphorus and/or potassium in such forms that they are available for assimilation by plants. The plant food content of a fertiliser is expressed as the total of the percentages of N, $P_2O_5$ and $K_2O$. Potassium metaphosphate, i.e. potassium Kurrol's salt $(KPO_3)_n$, is a highly concentrated fertiliser in as much as it has a plant food content of 100%. Although this salt is a water-insoluble material, it is known that in the soil the availability of the $P_2O_5$ and $K_2O$ is comparable to other conventional fertiliser materials. Furthermore the physical properties of potassium metaphosphate are such that it is suited as a fertiliser: it does not cake or lose its free-flowing character on storage as many other fertilisers do.

However, extensive commercial exploitation of potassium metaphosphate as a fertiliser has been prevented by difficulties in manufacture and by disadvantages which are described hereafter.

It is known that potassium metaphosphate can be prepared by the reaction of phosphoric acid and potassium chloride at elevated temperatures. Past practice has been to use a relatively pure phosphoric acid and to carry out the reaction at relatively high temperatures (>900° C.). The disadvantages of this method are:

(1) The high operating temperatures.
(2) The corrosive nature of the reactants at these high temperatures.
(3) The need for relatively pure phosphoric acid.
(4) The product is obtained in the form of a solidified melt which is difficult to convert into a form, e.g. granular, suitable for use as a fertiliser.

We have now found that potassium metaphosphate can be manufactured by the reaction of potassium chloride or sulphate and phosphoric acid at relatively low temperatures. Potassium metaphosphate can be so prepared in a granular form which is ideally suited for use as a fertiliser.

Accordingly, our invention provides a process of manufacturing potassium metaphosphate by reacting potassium chloride or sulphate and a phosphoric acid at a temperature below the fusion point of the product, the reaction being carried out on the surface of moving inert particles to produce a granular product. Our invention also provides potassium metaphosphate prepared by such a process.

In operating the invention, the reactants may be added to the inert particles either separately or mixed together. If the reactants are mixed together before the addition, the mixture may be a liquid, which may be sprayed on to the inert particles, or a slurry.

The particles to which the reactants are added may be at a temperature within the reaction range referred to below or, optionally, may be at a lower temperature. It is preferred that the addition be made to particles at the higher reaction temperatures since the rapid evolution of water vapour and the initial reaction which then takes place make it possible to add a greater proportion of reactants without causing the inert particles to stick together and agglomerate to any appreciable extent. It is an essential feature of this invention that the inert particles are in a free flowing state and the process is operated and controlled as described below so as to maintain the particles in this condition.

The inert particles on which the reaction is carried out may be any material which does not decompose or react to any substantial degree under the prevailing conditions; the invention is not restricted to the use of particles which are inert in other circumstances. In fact the inert particles are preferably of a material having a plant food content which becomes available when the product of the process is used as a fertiliser, since by this means the plant food value of the granular product may be maintained at a relatively high level or augmented by other ions. Potassium metaphosphate itself is a particularly suitable material and potassium chloride or sulphate may also be used. In the case of potassium chloride and sulphate, some reaction of the outermost portion of the particles may take place but the major innermost portion is unaffected.

The reaction temperature in the present invention lies within a range, the upper limit of which is the fusion point of the product. The fusion point of pure potassium metaphosphate is 810° C., but the presence of impurities, such as unreacted potassium chloride, may lower this to about 600° C. The lower limit is governed by the fact that, as has been stated, it is a necessary part of the invention to maintain the particles in a free flowing condition, obviously if the reaction temperature is too low the liquid phase in the reactants will be too slowly removed and the particles will agglomerate. Preferably the reaction involving potassium chloride is carried out at a temperature above 350° C.; and that involving potassium sulphate above 400° C. When wet process phosphoric acid and fertiliser grade potassium chloride are the reactants, the preferred reaction temperature to be used in our process is 400° C. to 500° C. When potassium sulphate is the potassic reactant the preferred temperature range is 450°–550° C.

It is a feature of the process described in this invention that the reactants need not be of high purity, especially if the product is required for use as a fertiliser. We have found that wet process phosphoric acid and fertiliser grade potassium chloride or sulphate are convenient reactants and they give a product which is suitable as a fertiliser. The term phosphoric acid is used in this specification to apply to any phosphoric acid (e.g. orthophosphoric acid, pyrophosphoric acid), or mixtures of these acids, or phosphoric acids of which the $P_2O_5$ content has been enriched by the addition of phosphorus pentoxide. The potassium chloride or sulphate used in the process may be one of the commercial grades of these salts, or a mineral form such as sylvite, so long as the impurities introduced thereby are not such as to interfere with the process or cause a product to be formed which does not possess the desirable properties normally associated with potassium metaphosphate prepared according to our process.

Ideally, the stoichiometrical proportions of $H_3PO_4$ and KCl or $K_2SO_4$ to give $(KPO_3)_n$ should be used, but in practice, if impure raw materials are used, the proportions of the reactants needed to give a substantially chloride-free product depend upon the impurities (e.g. $H_2SO_4$ and Nacl in the raw materials) present. If the P:K ratio in the reactants is less than one then, unless there is some other acidic material present, such as sulphuric acid, which is capable of reaction with potassium chloride, the product formed will contain unreacted potassium chloride or sulphate and it will not possess quite as good storage properties as those of potassium metaphosphate. If the ratio is greater than one, the product will be acidic and will be contaminated with other condensed phosphates which may impart less favourable storage properties to it. If the ratio is greater than 1.5 very little potassium metaphosphate is formed at all.

It is sometimes desired to obtain a product from our process in which the $K_2O:P_2O_5$ ratio is greater than in potassium metaphosphate. One way of achieving this in the process using potassium chloride is by the addition of sulphuric acid to the phosphoric acid; the product so formed retains the desirable property of being chloride-free; to obtain our preferred product, however, the weight of $H_2SO_4$ should not exceed that of $H_3PO_4$. An alternative way of obtaining a product of a $K_2O:P_2O_5$ ratio greater than in potassium metaphosphate is to use an excess of potassium chloride or sulphate. The amount of this excess depends on the users' requirements and in no way is intended as a limit to this invention.

We have found that using fertiliser grade potassium chloride (60% $K_2O$) and wet process phosphoric acid, which contains a small percentage of sulphuric acid, the P:K ratio in the reactants should be about 0.95.

We have found a rotary kiln to be a convenient apparatus in which to carry out the reaction. However, we do not intend this form of apparatus to be a limiting feature of our invention and any type of apparatus is suitable in which it is possible to react the potassium chloride or sulphate and a phosphoric acid on the surface of moving inert particles. Though it is preferred to maintain the particles in constant motion, this is not necessary in the process of the present invention, the important requirement being that the particles are moved relative to one another during the course of the reaction to a degree sufficient to maintain them in a free-flowing state and to produce a granular product. For example, the reaction may be carried out in apparatus of the "salt cake furnace" type in which a bed of the particles is moved by rotating arms. The reaction may be carried out in one stage or in a number of stages in a series of reactors.

The reactants may be added to the inert particles in the reactor or they may be premixed with particles before entering the reactor. For reasons given before, the reactants are preferably added to hot inert particles.

The product is granular, the size of the granules being controllable by variation of the conditions. Factors which affect the granule size include (a) the reaction temperature, (b) the movement of the particles, (c) the rate and method of addition of the reactants, and (d) the size of the particles forming the reaction bed. Granules within the size range 1–4 mm., a range suitable for use as granular fertilisers, are readily obtained by our process. The product may be used alone as a fertiliser or as an ingredient in a fertiliser mixture, for which purpose it may be ground if desired.

It is convenient to operate the process of the present invention in a continuous manner in which part of the product is removed and replaced by an equivalent amount of reactants and inert particles so as to maintain a substantially constant amount of material in the reaction zone. Where the inert particles added to the reaction zone are not potassium metaphosphate, the reactants and particles should be added in a constant proportion. In any case, the inert particles to be added should be finer than the granular product since the size of the particles is increased during the course of the reaction by the formation of potassium metaphosphate on the surface. The inert particles added are suitable fines or cracked oversize granules previously removed from the reaction zone. In a preferred process, a minor proportion of the granular product is removed for sizing, the major proportion being recycled whilst still hot and mixed with a further quantity of the reactants.

The following examples are quoted as illustrations of the ways in which our invention may be applied.

EXAMPLE 1

We have prepared fertiliser grade potassium metaphosphate, on a relatively small scale, in the following manner:

25 lb. of potassium metaphosphate particles (substantially ½–2 mm. diameter), which had been obtained from an earlier operation, were placed in a horizontal cylindrical furnace rotating at 12 r.p.m. The furnace was 2 ft. in diameter and 1½ ft. long. It was fitted with metal scoops so that particles were lifted from the rear of the moving bed and were discharged down an inclined chute to the front of the bed. The furnace was heated by external gas burners and a solution of reactants was introduced into the stream of hot particles passing down the chute. The temperature of the particles in the chute was 480° C. –500° C.

The solution of the reactants was introduced at about 60° C.; it contained 3 parts by weight of wet process phosphoric acid (28.6% $P_2O_5$), 1 part by weight of potassium chloride (fertiliser grade muriate of potash, 60% $K_2O$), and sufficient water to give complete solution of the potassium chloride. Water vapour and hydrochloric acid produced in the reaction were extracted from the furnace through a duct. When sufficient reactants to form 5 lb. of new product had been added to the reaction bed, that weight of granules was removed and kept as product. A total of 65 lb. of product was prepared in this manner. The size range of the product is given in Table I.

*Table I*

| Granule size: | Percent |
|---|---|
| <2 mm | 54 |
| 2–3.4 mm | 43 |
| >3.4 mm | 3 |

The product contained 52% $P_2O_5$, 38% $K_2O$ and 6% $SO_3$. It consisted of hard granules which were non-hygroscopic and non-corrosive and which did not show any tendency to cake on storage as many other fertilisers do.

In operating this process on a larger scale a proportion of the particles in the bed may be continuously removed.

EXAMPLE 2

A process for the large scale production of potassium metaphosphate is illustrated in the accompanying diagram. The raw materials used in the process are phosphoric acid (50% $P_2O_5$), prepared by concentration of wet process phosphoric acid, and potassium chloride (fertiliser grade muriate of potash, 60% $K_2O$). In order that the hydrochloric acid produced as a co-product from this process is relatively pure and free from hydrofluoric acid, it is necessary to defluorinate the phosphoric acid. Defluorinated phosphoric acid is conveniently prepared by the addition of a part of the potassium chloride to the acid, potassium silicofluoride being precipitated and removed by filtration.

A slurry of a mixture of the raw materials is added to a reactor 1, through a feed pipe 2. Hot recycle material at a temperature of about 500° C. is simultaneously added to the reactor 1, from a feed chute 3. We have found that it is advantageous to use a slurry of the reactants rather than a solution because thereby less water is introduced and the evaporative load on the system is reduced.

The heat introduced by the recycle material is enough to cause sufficient reaction of, and evaporation from the slurry so that the material leaves the reactor 1, at about 200° C. in a relatively free-flowing condition. We have used an insulated rotating drum as this reactor 1, but equally suitable would be a trough mixer or like apparatus. The material passes from the reactor 1, to a counter-current heated rotary kiln 5, from which it comes out fully reacted at about 500° C.

A portion of the material from 5 enters a counter-current rotary cooler 6. The cooled material passes up an elevator 7, and is separated into three fractions (<½ mm., ½–2 mm., >2 mm.) by the screens 8. A part of the product fraction, equivalent to the raw materials introduced into the system, is removed from the product hopper 9. The remaining product size material overflows into the fines hopper and is recycled with the fines and cracked oversize. The oversize material from the screens 8, is cracked in the oversize cracker 10.

This recycle material is then passed over a conveyor 11, into a recycle heater 4, through the feed chute 3, and thence it is returned, along with the material taken directly from unit 5, to the reactor 1.

The hydrogen chloride evolved in the reaction is removed through ducts 12 and 13, and is substantially collected as a useful co-product from this process.

EXAMPLE 3

Potassium metaphosphate was prepared on a laboratory scale from potassium sulphate and orthophosphoric acid in the following manner:

400 g. of previously prepared granular potassium metaphosphate were placed in a horizontal cylindrical furnace (7 inches in diameter), rotated at 36 r.p.m. The furnace was externally heated to maintain the bed of granules at 500° C.

A hot solution (80° C.) of the reactants (comprising 5 parts of potassium sulphate in 6½ parts of phosphoric acid (65% $P_2O_5$) and sufficient water to give complete solution of the potassium sulphate) was sprayed on to the hot bed. After sufficient solution had been added to give a total bed weight of 900 g., addition of the solution was stopped and the bed roasted at 500° C. to ensure complete reaction.

The product contained 59.0% $P_2O_5$, 39.0% $K_2O$ and no appreciable amount of sulphate. Its pH was 4.0. It consisted of very hard smooth granules, which were non-hygroscopic, non-corrosive and which did not show any tendency to cake on storage as many other fertilisers do.

This is a continuation in part of application 749,315, filed July 17, 1958, now abandoned.

What we claim is:

1. A process of manufacturing, substantially water insoluble granular potassium metaphosphate consisting essentially of completely reacting a potassium salt selected from the group consisting of potassium chloride and potassium sulphate, with a phosphoric acid at a temperature of above 350° C. but below the fusion point of potassium metaphosphate, said reaction being carried out on a mass of moving inert particles unable to react with said reactants to any substantial degree and selected from the group consisting of potassium metaphosphate, potassium chloride and potassium sulphate, as to provide a dry layer of potassium metaphosphate on each of said inert particles thereby yielding the desired granular end product.

2. A process as claimed in claim 1 in which the reaction is carried out in a continuous manner, a proportion of the product being removed and replaced by a phosphoric acid and a potassium salt, and inert particles selected from the group consisting of potassium metaphosphate, potassium chloride, and potassium sulphate, which are finer than the granular product.

3. A process as claimed in claim 1 in which the reactants are admixed with the inert particles in the form of a slurry.

4. A process as claimed in claim 1 in which the phosphoric acid contains sulphuric acid.

5. A process as claimed in claim 4 in which the phosphoric acid is wet process phosphoric acid.

6. A process as claimed in claim 5 in which the acid has been concentrated.

7. A process as claimed in claim 1 in which the phosphoric acid is of enriched $P_2O_5$ content.

8. A process as claimed in claim 1 in which the reaction is carried out in a series of stages, part of the hot reaction product being sized, separated, and cooled, and the remaining fines of said reaction product being reintroduced into the first stage of the series.

References Cited in the file of this patent

UNITED STATES PATENTS

| | | |
|---|---|---|
| 1,654,404 | Blumenberg | Dec. 27, 1927 |
| 1,799,479 | Pike | Apr. 17, 1931 |
| 2,064,979 | Kaselitz | Dec. 22, 1936 |
| 2,280,848 | Pole | Apr. 28, 1942 |
| 2,288,418 | Partridge | June 30, 1942 |
| 2,600,253 | Lutz | June 10, 1952 |
| 2,893,858 | MacDonald et al. | July 7, 1959 |
| 2,926,079 | Smith | Feb. 23, 1960 |